US011893722B2

(12) United States Patent
Tranchida et al.

(10) Patent No.: US 11,893,722 B2
(45) Date of Patent: Feb. 6, 2024

(54) METHOD FOR EVALUATION OF QUALITY OF LASER PRINTED SAMPLES

(71) Applicant: BOREALIS AG, Vienna (AT)

(72) Inventors: Davide Tranchida, Linz (AT);
Klaus-Juergen Buchmann, Linz (AT);
Bhawna Kulshreshtha, Vienna (AT);
Denis Yalalov, Stenungsund (SE)

(73) Assignee: Borealis AG, Vienna (AT)

( * ) Notice: Subject to any disclaimer, the term of this patent is extended or adjusted under 35 U.S.C. 154(b) by 389 days.

(21) Appl. No.: 16/973,483

(22) PCT Filed: Jun. 12, 2019

(86) PCT No.: PCT/EP2019/065328
§ 371 (c)(1),
(2) Date: Dec. 9, 2020

(87) PCT Pub. No.: WO2019/243130
PCT Pub. Date: Dec. 26, 2019

(65) Prior Publication Data
US 2021/0248733 A1    Aug. 12, 2021

(30) Foreign Application Priority Data
Jun. 19, 2018  (EP) .................................. 18178459

(51) Int. Cl.
*B41J 29/393*       (2006.01)
*G06T 7/00*         (2017.01)

(52) U.S. Cl.
CPC .......... *G06T 7/0004* (2013.01); *B41J 29/393* (2013.01); *G06T 2207/30144* (2013.01)

(58) Field of Classification Search
CPC ......... G06T 7/0004; G06T 2207/30144; G06T 7/0006; B41J 29/393
(Continued)

(56) References Cited

U.S. PATENT DOCUMENTS 5,075,875 A * 12/1991 Love ..................... G06F 3/1229
                                                   358/1.18
5,600,574 A    2/1997 Reitan
(Continued)

FOREIGN PATENT DOCUMENTS

CN    101055560 A    10/2007
CN    101303269 A    11/2008
(Continued)

OTHER PUBLICATIONS

Extended European Search Report for PCT/EP2019065328 dated Dec. 19, 2018, 9 pages.
(Continued)

*Primary Examiner* — Sheela C Chawan
(74) *Attorney, Agent, or Firm* — Lowenstein Sandler LLP (57) ABSTRACT

The present invention is directed to a method for quantitative and qualitative evaluation of laser printed samples, the method comprising the following steps: a) providing (S1) a laser printed sample, b) capturing (S2) a digital raster image of the laser printed part of the laser printed sample and thereon providing digital image information that constitutes the digital raster image, c) identifying (S3) at least one distinct part within the digital image information, d) obtaining at least one image histogram for the identified at least one distinct part of the digital image information, e) fitting (S4) a probability density function on the obtained at least one image histogram, and f) determining (S5) at least one parameter of the probability density function.

14 Claims, 5 Drawing Sheets

(58) Field of Classification Search
USPC ....... 382/100, 141, 168, 169, 181, 190, 199, 382/203, 298, 305
See application file for complete search history.

(56) References Cited

U.S. PATENT DOCUMENTS

| | | | | |
|---|---|---|---|---|
| 5,898,505 | A * | 4/1999 | Lin | H04N 1/4053 358/1.9 |
| 6,091,507 | A * | 7/2000 | Vatland | H04L 69/26 358/1.15 |
| 6,275,600 | B1 | 8/2001 | Banker et al. | |
| 2001/0016054 | A1 * | 8/2001 | Banker | H04N 1/00045 382/112 |
| 2012/0075649 | A1 * | 3/2012 | Tse | H04N 1/3873 358/1.13 |
| 2016/0314583 | A1 | 6/2016 | Couch | |

FOREIGN PATENT DOCUMENTS

| | | | |
|---|---|---|---|
| CN | 103168227 A | 6/2013 | |
| EP | 0710570 A1 * | 5/1996 | ............... G06T 7/00 |
| EP | 2800026 A1 | 11/2014 | |
| RU | 2013104131 A | 8/2014 | |
| WO | 0114928 A2 | 3/2001 | |

OTHER PUBLICATIONS

International Search Report and Written Opinion for PCT/EP2019/065328 dated Jul. 19, 2019, 11 pages.
Office Action with English translation for Russian Patent Application No. 2020142712/28, dated Jun. 24, 2021, 13 pages.
Search Report with English translation for Russian Patent Application No. 2020142712/28, dated Jun. 6, 2021, 4 pages.
Office Action with English translation for Chinese Patent Application No. 201980038330.0 dated Nov. 7, 2023, 23 pages.

* cited by examiner

METHOD FOR EVALUATION OF QUALITY OF LASER PRINTED SAMPLES

CROSS-REFERENCE TO RELATED APPLICATION(S)

This application is a national phase of International Application No. PCT/EP2019/065328, filed on Jun. 12, 2019, which claims the benefit of European Patent Application No. 18178459.6, filed on Jun. 19, 2018. The contents of these applications are hereby incorporated by reference in their entirety.

FIELD OF THE INVENTION

The present invention is directed to a method allowing an objective and quantitative evaluation of quality of laser printing on compression moulded plaques.

BACKGROUND

Marking of moulded articles is a continued need to indicate serial numbers and further information thereon. The skilled person knows suitable methods for marking of moulded articles made of polyolefin compositions like those based on polyethylene or polypropylene, e.g. conventional printing techniques like ink jet, embossing etc. In the area of communication and power cables, marking is necessary in order to provide information to the installer, such that the installation is done correctly and efficiently. Similarly, in the automotive field, marking is necessary to provide information about the manufacturer of the moulded article since often a particular moulded article to be used in e.g. a car is received from more than one supplier. Also several further data is often required on a moulded article, e.g. productions dates, expiry dates, bar codes, and company logos.

For many applications, however, conventional printing techniques like ink jet, embossing etc. are not suitable, since the outer surface of the moulded article is not sufficient for providing a print using the conventional techniques, or since the shape of the moulded article does not allow printing with conventional techniques, e.g. since the relevant part of the surface of the moulded article is non-planar.

Therefore, use of laser printing techniques is gaining more importance. In particular for fiber optic micro cables (FOC), conventional printing techniques are not suitable, given the very small outer surface of such micro cables. The increased need for micro cables has accordingly also increased the use of laser printing. One of the advantages of laser printing is that such printing can be performed at higher line speed compared to the alternatives, thus increasing cost-efficiency. Another advantage is that a laser-induced print cannot be erased so easily by rubbing or friction as opposed to ink-jet print.

There is currently much development in laser printing of polyolefin compositions, e.g. for improving contrast between a dark carbon black filled moulded article and a light marking obtained by laser printing. This process involves developing and identifying new polyolefin compositions for particular applications which allow e.g. such improved contrast upon laser printing. Of course, also tailoring the type and settings of the laser beam for a particular polyolefin composition in order to obtain the best contrast is a field of development.

In this regard, inspection of the laser printed samples, usually compression moulded plaques, and evaluating the quality if the print is of central importance. Up till now this inspection has been carried out using visual detection by human eye. Indeed, this is not a fully objective and quantitative method allowing to obtain a reproducible result.

Figure 1:
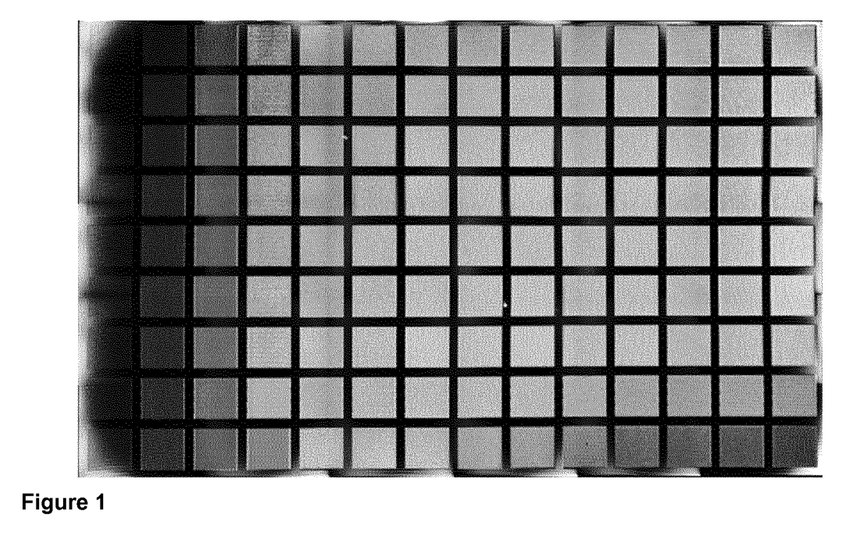
FIG. 1 shows a schematic diagram of an example of a plaque, printed with 126 different settings in different squares according to an exemplary embodiment of the invention.

An example of a typical print to be inspected by human eye is shown in FIG. 1.

FIG. 1 shows squares obtained by laser printing on a compression moulded sample of a polyolefin composition, the squares being arranged in a pattern of nine squares in a column and fourteen squares in a row resulting in 126 squares in total, each of which representing a particular setting of the laser beam.

What can be derived from FIG. 1 is that there are in general relatively good settings (centre part) and relatively deficient settings (left columns and bottom rows) for the particular compressing moulded sample, however, no quantitative information on print quality or contrast can be given.

There is accordingly still a need for providing an objective and quantitative method for evaluation of quality of laser printing on compression moulded plaques made of a polyolefin composition, the compression moulded plaques being the model system for moulded articles made of polyolefin compositions in general.

SUMMARY OF THE INVENTION

The present invention is based on the finding that the object can be solved by collecting a digital image of a laser printed sample, obtaining intensity distributions for several different parts of the image, identifying the center of a Gaussian curve fitted on each of the obtained intensity distributions, and recording the values of intensity of the centers of the Gaussian curves as a function of the different parts of the image for which the intensity distributions were obtained. Displaying this information allows a quantitative evaluation of the quality of the laser print of the sample and accordingly comparison with other samples.

Accordingly, the present invention is in one aspect directed to a method for quantitative and qualitative evaluation of laser printed samples, the method comprising the following steps:
 a) providing a laser printed sample,
 b) capturing a digital raster image of the laser printed part of the laser printed sample and thereon providing digital image information that constitutes the digital raster image,
 c) identifying at least one distinct part within the digital image information,
 d) obtaining at least one image histogram for the identified at least one distinct part of the digital image information,
 e) fitting a probability density function on the obtained at least one image histogram, and
 f) determining at least one parameter of the probability density function.

According to one embodiment of the present invention, the laser printed sample is a compression moulded plaque made of a polyolefin composition. This means that the compression moulded plaque consists of the polyolefin composition.

According to another embodiment of the present invention, the polyolefin composition contains at least 90 wt %, preferably at least 95 wt %, more preferably at least 98 wt %, still more preferably at least 98.5 wt %, of an ethylene homo- or copolymer or of a propylene homo- or copolymer, or of mixtures thereof. The content of the ethylene homo- or copolymer or of the propylene homo- or copolymer, or of mixtures thereof in the polyolefin composition is usually not higher than 99.5 wt %.

The terms "ethylene homopolymer" and "propylene homopolymer" as used herein relate to a polyethylene or polypropylene, respectively, that consists substantially, i.e. of at least 99.5 wt %, more preferably of at least 99.8 wt %, of ethylene or propylene units, respectively. In a preferred embodiment only ethylene or propylene units, respectively, are used in polymerization. In a preferred embodiment only ethylene or propylene units, respectively, are detectable in the ethylene homopolymer or propylene homopolymer, respectively.

The term "copolymer" as used herein covers polymers obtained from co-polymerisation of at least two, i.e. two, three or more different monomers, i.e. the term "copolymer" as used herein does e.g. not exclude so-called terpolymers obtained from co-polymerisation of three different monomers.

Suitable ethylene homopolymers are low density polyethylene (LDPE, density of 0.910-0.940 $g/cm^3$) and high density polyethylene (HDPE, density of at least 0.941 $g/cm^3$).

The melt flow rate of suitable ethylene homopolymers is preferably 0.2 to 3.0 g/10 min, more preferably 0.2 to 2.0 g/10 min.

Suitable ethylene copolymers are linear low density polyethylene (LLDPE, density of 0.915-0.925 $g/cm^3$) and very low density polyethlylene (VLDPE, density of 0.880-0.915 $g/cm^3$). Suitable comonomers are C3-C12-alpha-olefins, preferably 1-butene, 1-hexene, 4-methyl-1-pentene, and/or 1-octene.

Suitable propylene homopolymers are high isotactic propylene homopolymers.

Suitable propylene copolymers are copolymers, i.e. random and block copolymers, with ethylene and/or a C4-C12-alpha-olefin, preferably with ethylene, 1-butene, 1-hexene, 4-methyl-1-pentene, and/or 1-octene. Suitable propylene copolymers include impact copolymers having a matrix which is a propylene homopolymer or a propylene random copolymer having dispersed therein an ethylene-propylene rubber (EPR).

According to a further embodiment of the present invention, the laser print on the sample comprises at least one distinct area which comprises a congruent form, which is congruent to the at least one distinct part.

According to a further embodiment of the present invention, the at least one distinct part identified within the digital image in step c) corresponds to the at least one distinct area of the laser print on the sample.

According to a further embodiment of the present invention, the laser print on the sample comprises multiple distinct areas, which corresponding in size and/or shape at least partially to each other.

According to a further embodiment of the present invention, the multiple distinct areas are multiple squares at least partially arranged in an array.

According to a further embodiment of the present invention, the multiple distinct parts are identified within the digital image in step c) corresponding to the multiple distinct areas of the laser print on the sample.

According to a further embodiment of the present invention, the digital raster image comprises a size of 300 pixel×300 pixel to 2000 pixel×2000 pixel.

According to a further embodiment of the present invention, for multiple distinct parts of the digital image information multiple image histograms are obtained for each of the multiple distinct parts of the digital image information.

According to a further embodiment of the present invention, the digital raster image of the laser printed part of the laser printed sample is captured in step b) such that the magnification is in the range of 30× to 150×, preferably of 40× to 100×.

According to an equally preferable embodiment of the present invention, the digital raster image of the laser printed part of the laser printed sample is captured in step b) such that the magnification is in the range of 30× to 90×, preferably of 40× to 80×, more preferably of 40× to 70×, still more preferably in the range of 40× to 60×.

According to a further embodiment of the present invention, the laser printed part of the laser printed sample has a plain surface.

According to a second aspect of the present invention, a computer program product is provided comprising instructions which, when the program is executed by a computer, cause the computer to carry out the steps of the method of the first aspect or of any one of the embodiments of the first aspect.

According to a third aspect of the present invention, a computer-readable storage medium is provided comprising instructions which, when executed by a computer, cause the computer to carry out the steps of the method of the first aspect or of any one of the embodiments of the first aspect.

According to a fourth aspect of the present invention, a data processing system is provided comprising means for carrying out the steps of the method of the first aspect or of any embodiment of the first aspect.

A computer program performing the method of the present invention may be stored on a computer-readable medium. A computer-readable medium may be a floppy disk, a hard disk, a CD, a DVD, an USB (Universal Serial Bus) storage device, a RAM (Random Access Memory), a ROM (Read Only Memory) and an EPROM (Erasable Programmable Read Only Memory).

A computer-readable medium may also be a data communication network, for example the Internet, which allows downloading a program code.

The methods, systems and devices described herein may be implemented as software in a Digital Signal Processor, DSP, in a micro-controller or in any other side-processor or as hard-ware circuit within an application specific integrated circuit, ASIC, CPLD or FPGA.

The present invention can be implemented in digital electronic circuitry, or in computer hard-ware, firmware, software, or in combinations thereof, e.g. in available hardware of conventional mobile devices or in new hardware dedicated for processing the methods described herein.

BRIEF DESCRIPTION OF THE DRAWINGS

A more complete appreciation of the invention and the attendant advantages thereof will be more clearly understood by reference to the following schematic drawings, which are not to scale, wherein.

DETAILED DESCRIPTION OF EMBODIMENTS

The illustration in the drawings is schematically and not to scale. In different drawings, similar or identical elements are provided with the same reference numerals.

Generally, identical parts, units, entities or steps are provided with the same reference symbols in the figures.

FIG. 1 shows a schematic diagram of an example of a plaque, printed with 126 different settings in different squares according to an exemplary embodiment of the invention.

An example of a quantitative method is given in FIG. 1, where squares were printed with 126, e.g. an array of 14×9, different settings. It is possible to recognize, said in general, good or suitable (centre part) and deficient settings (left columns and bottom lower squares), however, no quantitative information can be given directly from the image. According to an embodiment of the present invention, the laser print on the sample comprises at least one distinct area which comprises a congruent form, which is congruent to the at least one distinct part. For example, the laser print on the sample comprises multiple distinct areas, which corresponding in size and/or shape at least partially to each other.

The laser printed sample is for instance a compression moulded plaque made of a polyolefin composition. According to an embodiment of the present invention, the laser printed part of the laser printed sample has a plain surface, e.g. site flatness: smaller than 2.0 µm.

A large enough magnification is a prerequisite in order to image each square in good detail, yet not too large to be of practical use. For example, a 50× magnification is used, but also 20× magnification may be used, which is not sufficient, and 100× magnification and 150× magnification which gave also good images however each image was of about 1 GB in size for storage and the set of 126 squares had to be divided in an unpractical set of four large images.

Particular care was given to all the additional minor settings, since obviously the appearance of an optical microscopy picture can be changed significantly. Fixing all possible parameters is particularly important for a method description, to disclose it clearly and to allow anyone to repeat properly the experiment. All these details are listed in the method description.

Additionally, the analysis must be independent of the operator. Therefore, a computer program code was written to analyse the 126 squares automatically and consistently. The use of an automatic analysis has also the benefit that many plaques can be analysed in short time, while this task would be tremendously time consuming in the case of a manual evaluation.

The computer program code was written in such a way that the analysis can also be easily implemented in any lab, and thus can be transferred to e.g. customers. A menu is shown, see FIG. 2, highlighting the steps to be taken.

Figure 2:
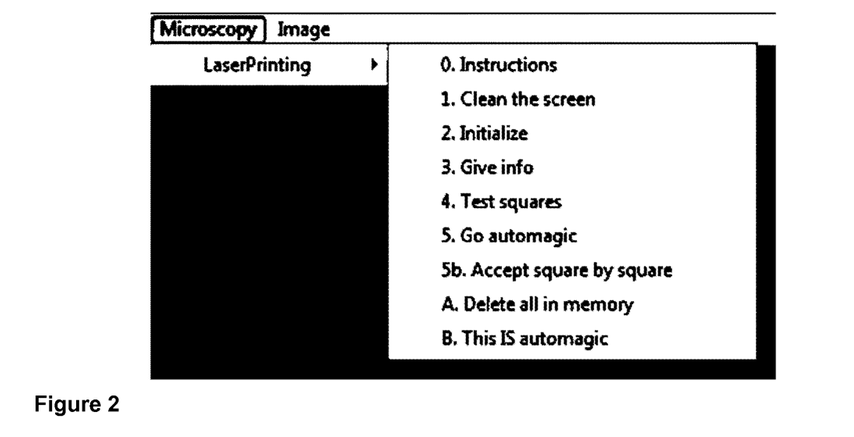
FIG. 2 shows a schematic diagram of a screen shot of a graphical user interface of a computer program product according to an exemplary embodiment of the invention.

FIG. 2 shows a schematic diagram of a screen shot of a graphical user interface of a computer program product according to an exemplary embodiment of the invention.

The step "0. Instructions" prints details and instructions on how to perform the analysis and therefore it is designed as a quick training and reminder.

The step "1. Clean the screen" closes all windows, possibly previously opened by the last analysis, and lets the user start.

The step "2. Initialize" creates two windows that are the ones that will be saved in the following analysis, namely an image for the square being analysed and the distribution of intensities as shown in examples in the following FIG. 4. It also prompts the user for loading the image with the squares that will be analysed next. The software is at this point ready to run.

The step "3. Give info" is designed to insert the name of the sample, the magnification used, and two parameters for finding the correct settings for the automatic detection of the squares.

It also allows the user to insert the information whether the image being analysed is the first or the second part of the 126 squares currently under investigation.

The step "4. Test squares" runs the part of the code to automatically find the squares and displays a copy of the original image with overlayed automatically detected squares, painted in black. This is performed as a safety procedure, to make sure that the code identified the squares correctly before running the full analysis. If the squares are not identified correctly, the user can go back to step 3 and provide additional parameters mentioned above, being horizontal and vertical shifts for the squares.

Figure 3:
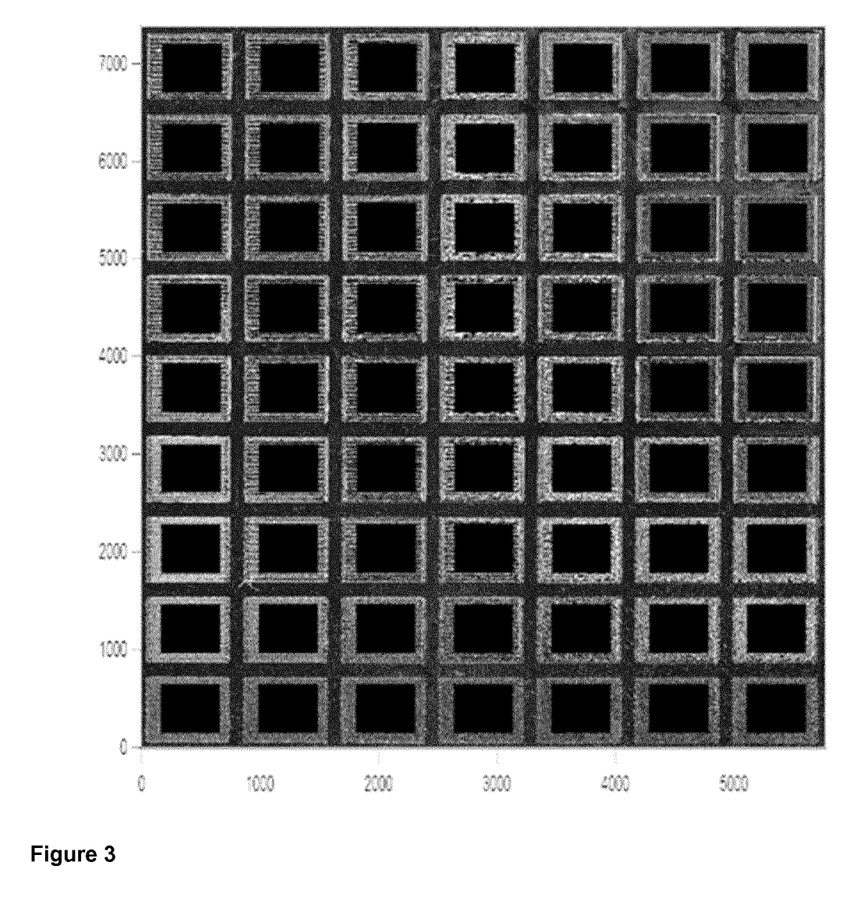
FIG. 3 shows a schematic diagram of an example where the various regions of interest, created automatically, inside the squares are colored in black according to an exemplary embodiment of the invention.

In particular concerning this step 4, the code as written loads the images of interest and automatically creates a region of interest inside each square (500×500 pixels$^2$ on top of the full 2000×2000 pixels$^2$), see FIG. 3.

FIG. 3 shows a schematic diagram of an example where the various regions of interest, created automatically, inside the squares are colored in black according to an exemplary embodiment of the invention.

This smaller region was chosen because sometimes the borders of the squares are not really clear, and it allows us to automatically fix the different squares while preserving enough info since 250,000 pixels are enough to create intensity distributions as discussed below. The digital raster image for instance in an example comprises a size of 300 pixel×300 pixel to 2000 pixel×2000 pixel.

The step "5. Go automagic" provides the analysis of each single square. For each square, a histogram is created for the intensity distribution. This distribution is finally fitted with a Gaussian curve and the center of this curve is registered. This corresponds to the "level of whiteness" of the square.

Figure 4:
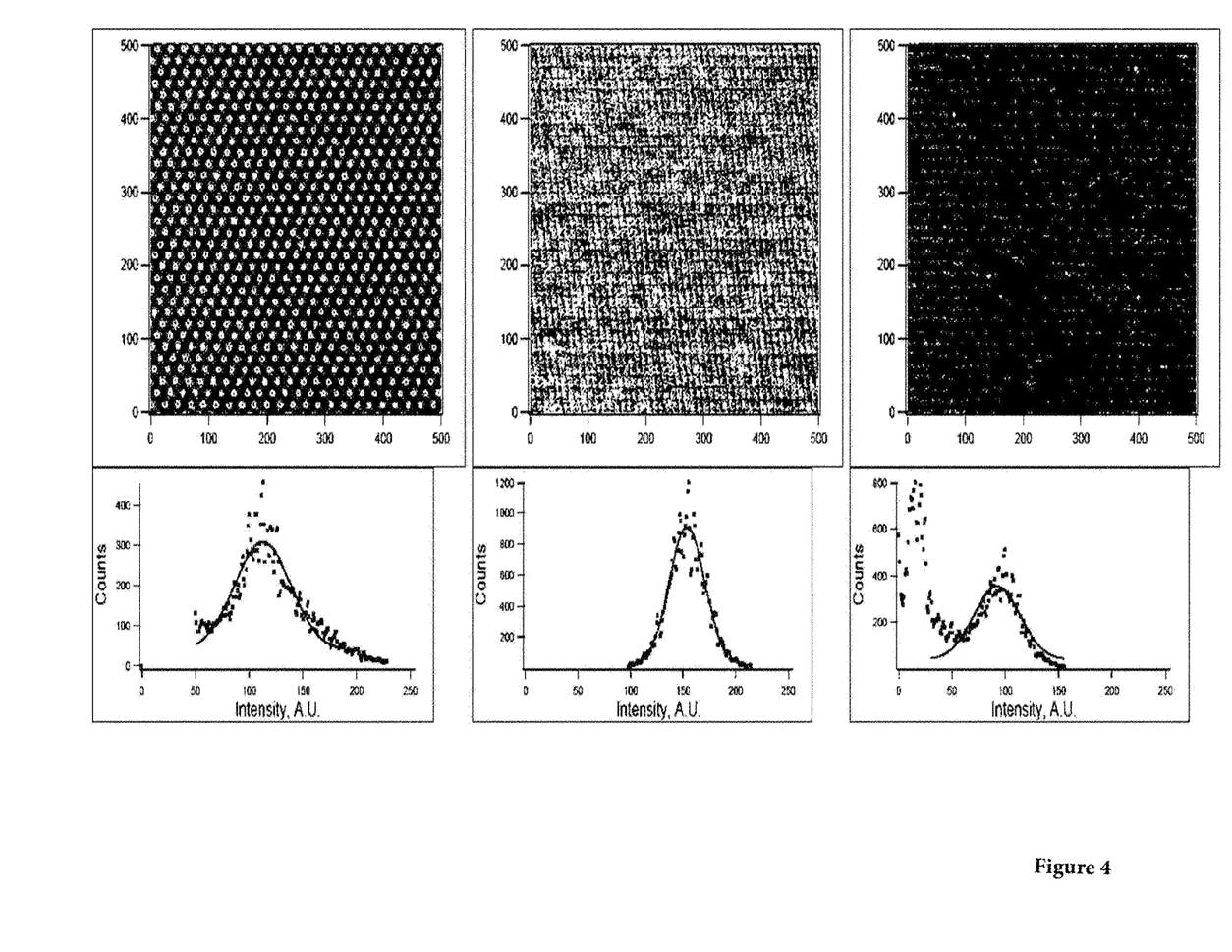
FIG. 4 shows a schematic diagram of an example of the results, where the square and the corresponding intensity distribution is saved according to an exemplary embodiment of the invention.

The result of the analysis is therefore 126 different files—for instance files in the pdf format—like the ones shown in the example of FIG. 4.

FIG. 4 shows a schematic diagram of an example of the results, where the square and the corresponding intensity distribution is saved according to an exemplary embodiment of the invention.

The three most common appearances are shown in this figure. The squares can indeed be filled with distinct dots, with clear lines alternated to black lines, or be more orderly covered by printed areas.

This process is performed automatically for all squares, however in case of a more detailed analysis, there is a possibility to show and accept the analysis of each single square, through the use of the option "5b. Accept square by square".

After having analysed all the 126 squares, the code saves the results in a.csv file, having the same name as the user entered for the sample being analysed, to proceed with analysis and comparisons afterwards.

Additionally, two more entries in the menu are "A. Delete all in memory", which indeed deletes all information in memory in the software, to be used at the beginning of an analysis, and most importantly "B. This IS automagic" which performs the steps 1-5 detailed above automatically without the need of the user to click anything, apart from selecting the images to analyse and providing the sample name.

Figure 5:
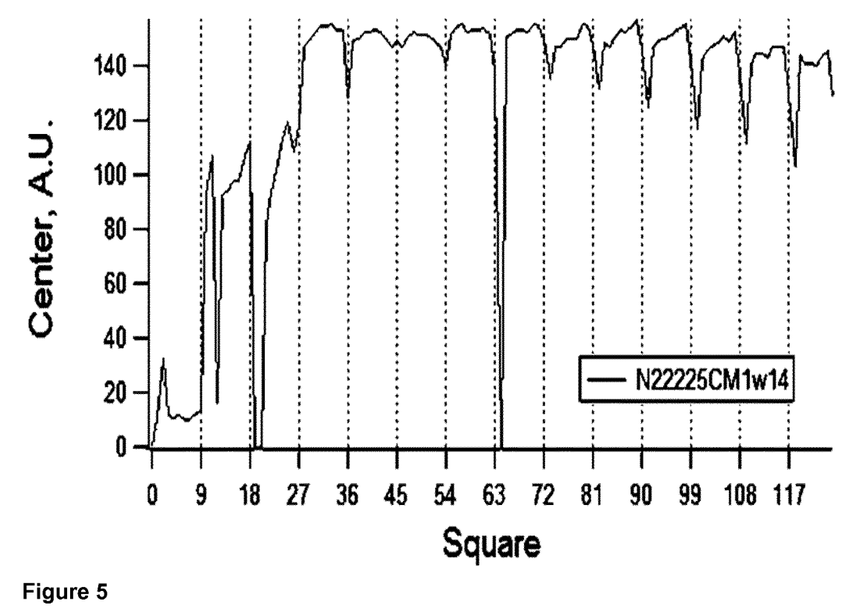
FIG. 5 shows an image of an example of the final result according to an exemplary embodiment of the invention.

FIG. 5 shows an image of an example of the final result according to an exemplary embodiment of the invention.

The center points of the Gaussian fit of the 126 squares are plotted in one single graph, where the squares "1-9" relate to the first column, the squares "10-18" to the second column and so on. It can be noticed that after the fourth column, starting at square 27, the squares are bright and "good".

Figure 6:
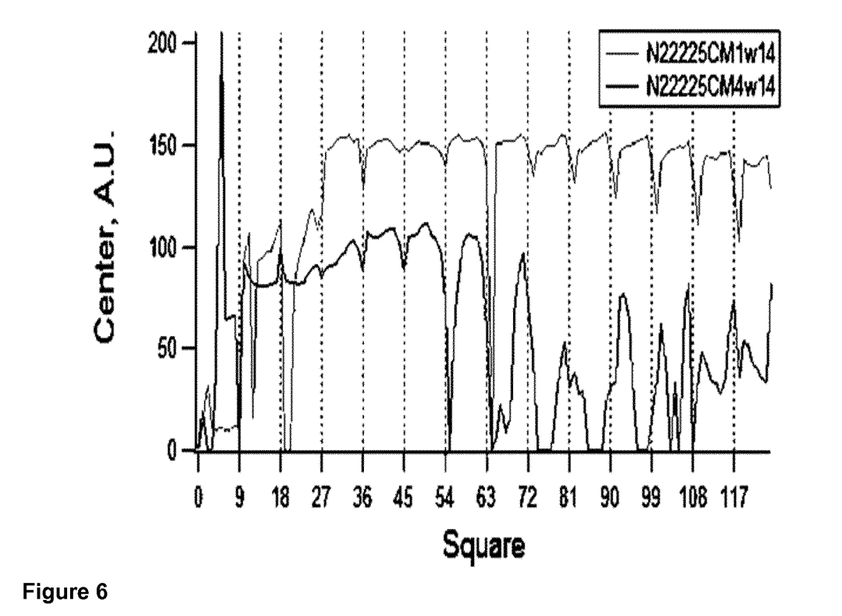
FIG. 6 shows comparison of a suitable sample and a deficient sample according to an exemplary embodiment of the invention.

FIG. 6 shows a comparison of a good sample and a bad sample according to an exemplary embodiment of the invention.

Images were collected with a Keyence VHX-5000 microscope with objective 50×, namely: Z20:X50. Exposure time was fixed at 14 ms, which in this microscope univocally identifies the settings of the lighting to be used. In particular, the standard LED ring provided with the microscope was used. The images were collected in monochromatic manner, i.e. black and white in order to have an image with a unique intensity value. A diffuser should not be used.

The additional settings in the microscope software, e.g. contrast or sharpness increasers or amplifiers were all set off as this can change the images in an uncontrolled manner. For each setting of the laser printing, a square of 500×500 pixels$^2$ was selected, well inside the printed area. The histogram of the distribution of the intensity was subsequently calculated, and treated with a median filter 3 in order to smoothen its shape. This distribution was fitted with a Gaussian curve, and the center of this Gaussian curve was recorded for each square.

An appropriate and a deficient sample are compared in FIG. 6. As shown in the example of FIG. 6, after the third column the suitable sample (N22225-CM1) shows squares with relatively high centre point of the Gaussian fit. The deficient sample (N22225-CM4) shows a tiny range, between squares 9 and 50, with roughly constant center points, pointing to a decent printing however not as good as the previous sample since the centres are in the order of 100, i.e. dark. Additionally, after square 50, the centres become scattered and low, which is in agreement with the visual observation that shows these squares to appear like "burnt".

Figure 7:
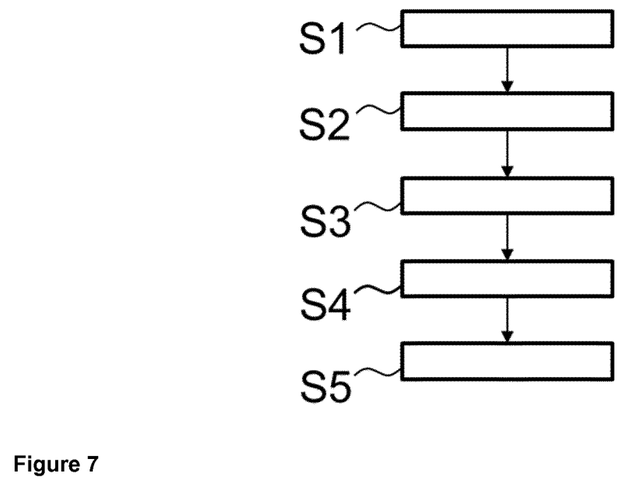
FIG. 7 shows a schematic flowchart diagram of a method for quantitative and qualitative evaluation of laser printed samples according to an exemplary embodiment of the invention.

FIG. 7 shows a schematic flowchart diagram of a method for quantitative and qualitative evaluation of laser printed samples according to an exemplary embodiment of the invention.

The method for quantitative and qualitative evaluation of laser printed samples may comprise at least the following steps:

As a first step of the method, providing S1 a laser printed sample is performed.

As a second step of the method, capturing S2 a digital raster image of the laser printed part of the laser printed sample and thereon providing digital image information, that constitutes the digital raster image, is performed.

As a third step of the method, identifying S3 at least one distinct part within the digital image information, obtaining at least one image histogram for the identified at least one distinct part of the digital image information is conducted.

As a fourth step of the method, fitting S4 a probability density function on the obtained at least one image histogram, is conducted.

As a fifth step of the method, determining S5 at least one parameter of the probability density function is conducted.

A computer program may be stored and/or distributed on a suitable medium, such as an optical storage medium or a solid state medium supplied together with or as part of other hardware, but may also be distributed in other forms, such as via the internet or other wired or wireless tele-communication systems.

However, the computer program may also be presented over a network like the World Wide Web and can be downloaded into the working memory of a data processor from such a network.

According to a further exemplary embodiment of the present invention, a data carrier or a data storage medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims.

However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method for quantitative and qualitative evaluation of laser printed samples, the method comprising the following steps:
   a) providing (S1) a laser printed sample, the laser printed sample having a multiplicity of distinct laser printed parts thereon, each laser printed part being generated with a different setting of the laser used to generate the laser printed part;

b) capturing (S2) a digital raster image of each of the multiplicity of the laser printed parts of the laser printed sample using an optical microscope, and thereon providing digital image information that constitutes the digital raster image of each laser printed part;
c) identifying (S3) at least one distinct part within the digital image information of each laser printed part;
d) obtaining at least one image histogram for the identified at least one distinct part of the digital image information of each laser printed part;
e) fitting (S4) a probability density function on the obtained at least one image histogram; and
f) determining (S5) at least one parameter of the probability density function.

2. The method according to claim 1, wherein step d) is conducted by evaluating a plurality of small regions selected within the identified at least one distinct part.

3. The method according to claim 1, wherein the laser printed sample is a compression moulded plaque made of a polyolefin composition.

4. The method according to claim 3, wherein the polyolefin composition contains at least 90 wt % of an ethylene homo- or copolymer or of a propylene homo- or copolymer.

5. The method according to claim 1, wherein each laser printed part comprises a congruent form, which is congruent to the at least one distinct part.

6. The method according to claim 5, wherein the at least one distinct part identified within the digital image in step c) corresponds to one of the laser printed parts on the sample.

7. The method according to claim 5, wherein the laser printed parts on the sample correspond in size and/or shape at least partially to each other.

8. The method according to claim 7, wherein the laser printed parts are multiple squares at least partially arranged in an array.

9. The method according to claim 1, wherein the digital raster image comprises a size of 300 pixel×300 pixel to 2000 pixel×2000 pixel.

10. The method according to claim 1, wherein the digital raster image of the laser printed part of the laser printed sample is captured in step b) such that the magnification is in the range of 30× to 90×.

11. The method according to claim 1, wherein the laser printed parts of the laser printed sample have a plain surface.

12. A computer program product comprising instructions which, when the program is executed by a computer, cause the computer to carry out the steps of the method of claim 1.

13. A non-transitory computer-readable storage medium comprising instructions which, when executed by a computer, cause the computer to carry out the steps of the method of claim 1.

14. A data processing system comprising means for carrying out the steps of the method of claim 1.

* * * * *